Feb. 2, 1965 C. A. BOYD 3,168,662
SEAL FOR SUBMERSIBLE MOTORS
Filed March 3, 1961

INVENTOR.
Clinton A. Boyd
BY
Andrus & Starke
Attorneys

United States Patent Office 3,168,662
Patented Feb. 2, 1965

3,168,662
SEAL FOR SUBMERSIBLE MOTORS
Clinton A. Boyd, Tulsa, Okla., assignor to Sta-Rite Products, Inc., Delavan, Wis., a corporation of Wisconsin
Filed Mar. 3, 1961, Ser. No. 93,192
4 Claims. (Cl. 310—86)

This invention relates to a submersible motor-pump unit and more particularly to a structure for securing the motor shell to the bearing housings of the motor unit.

In the conventional submersible motor pump unit, the motor and pump are both submerged within the liquid to be pumped and the motor is enclosed by an outer shell or casing which is sealed at its ends to an upper and lower bearing housing which journals the motor drive shaft. As the motor is submerged within the pump liquid, it is important that the outer casing be sealed to the bearing housings to prevent leakage of fluid into the motor cavity. In some cases the shell is welded to the bearing housings. However, in a welded unit, heat generated during the welding may have an adverse effect on the motor windings, and secondly, welding provides a permanent connection which makes it very difficult to separate the members for maintenance or repair.

In other cases, the shell is attached to the housings by separate screws or the ends of the shell and housings are threaded, or various types of clamping mechanism are employed. However, with these mechanical types of connections, separate sealing members are required to seal the joint between the shell and the housing and prevent leakage of fluid therebetween.

The present invention is directed to a structure for securing the ends of the motor shell to the bearing housings, which not only provides a firm connection between the members, but also provides a seal to prevent leakage of the pumped fluid into the motor cavity.

More specifically, the bearing housings are each provided with a pair of annular recesses. One of the recesses is disposed adjacent the end of the respective bearing housing and the second recess, having a larger outside diameter, is located axially adjacent the first recess. The end portions of the shell are press fitted on the outer or second recess and the inner surface of the shell is spaced from the inner recess to provide an annular clearance between the members. A cured thermosetting resin is disposed within the clearance and serves to firmly bond the shell to the respective bearing housings.

The stepped construction in the bearing housing provides a press fit between the motor shell and the housing, thereby aligning the shell and insuring that the thin wall flexible shell is not deformed or out-of-round. In addition, the press fit insures that the annular space or clearance for the resin is of constant radial dimension so that a uniform layer of resin will be located throughout the circumferential extent of the members. As the resin is located within the inner recess which is spaced out of contact with the inner wall of the shell, the shell will not scrape the resin from the housing as the shell is inserted onto the housing members and thus the uniform coating of resin will be retained at the joint.

Not only does the cured thermosetting resin securely bond the two members together, but it also serves as a seal to prevent leakage at the joint. The use of the resin is considerably less expensive than other methods of securing the members together and eliminates up to 20 parts as compared to a clamping type of connection which requires auxiliary sealing members, and it also eliminates a substantial portion of the machining operations which are required with the conventional mechanical-type joint construction. While the bonded resin joint is a permanent type of joint in service, the joint can be broken for purposes of repair or maintenance by heating the area of the bond to a temperature in the range of 400° F. to 600° F. to thereby decompose the resin bond. After the necessary repair, the shell can be rebonded to the bearing housings by the application of an additional coat of the uncured thermosetting resin.

Other objects and advantages will appear in the course of the following description.

The drawings illustrate the best mode presently contemplated of carrying out the invention.

Figure 1:
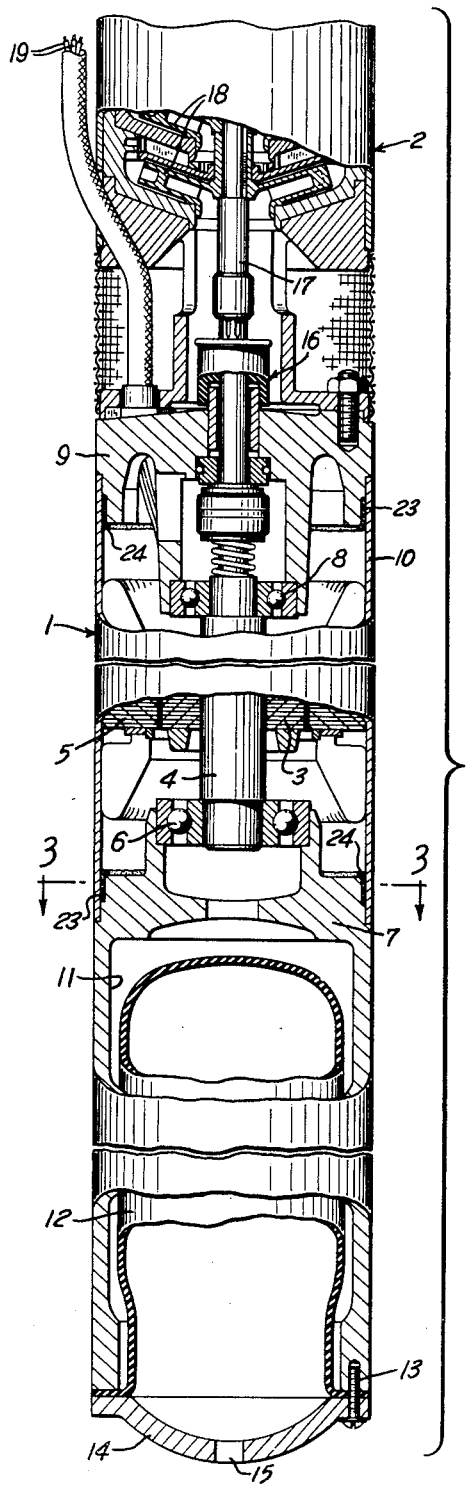
FIGURE 1 is an elevational view of a submersible motor-pump unit with parts broken away in section.

The drawings illustrate the submersible motor-pump unit which includes a motor unit 1 and a pump unit 2 which is disposed above the motor unit. The motor unit 1 includes a rotor 3 which is secured to a rotor shaft 4 and rotates within an annular fixed stator 5. The lower end of the rotor shaft 4 is journaled within a lower bearing assembly 6 supported within a recess in lower bearing housing 7, while the upper end of the rotor shaft 4 is journaled within an upper bearing assembly 8 mounted within a recess in the upper bearing housing 9. The motor unit 1 is enclosed by a cylindrical, thin-walled, metal shell 10 which is connected to the bearing housings 7 and 9.

The lower bearing housing 7 is elongated and is provided with a central cavity or recess 11 which contains a pressure equalizing bag 12. The outer end of the bag 12 is disposed over the end of the bearing housing 7 and is secured to the end of the housing by a series of bolts 13 which connect an outer cap 14 to the housing 7. The cap 14 is provided with a central opening 15 so that the pumped fluid may enter the cavity 11 and will act on the inner surface of the bag 12. The bag 12 is a common type of pressure equalizing member that serves to equalize the pressure between the oil in the motor cavity and the pressure of the fluid being pumped.

The pumped liquid is prevented from entering the motor cavity along the upper portion of the rotor shaft 4 by means of a seal assembly 16 which is supported by the upper bearing housing 9 and serves to prevent the inward flow of the liquid along the rotor shaft.

The upper end of the rotor shaft 4 is secured to the lower end of a pump shaft 17 which carries a series of impellers 18. Rotation of the rotor shaft serves to drive the impellers to thereby draw liquid upwardly through the lower end of the pump unit and discharge the same through the upper end of the unit.

Electrical energy is supplied to the motor 1 by a plurality of leads 19 which extend downwardly along the pump 2 and are disposed in sealed relation within an opening in the upper bearing housing 9.

The motor 1 and pump 2 are of conventional design and do not in themselves form part of the present invention.

According to the invention, the ends of the motor shell 10 are secured to the bearing housings 7 and 9 by a cured hermosetting resin which functions not only to firmly bond the members together, but also to provide a seal which prevents the leakage of the pumped fluid into the motor cavity.

Figure 2:
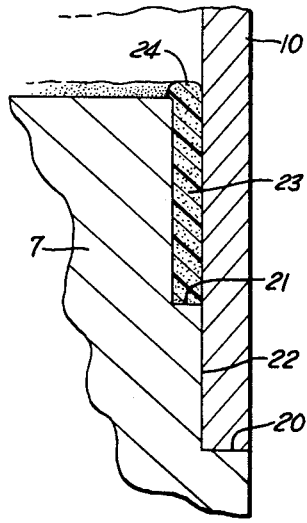
FIG. 2 is an enlarged fragmentary view showing the joint construction between the motor shell and the lower bearing housing.
Figure 3:
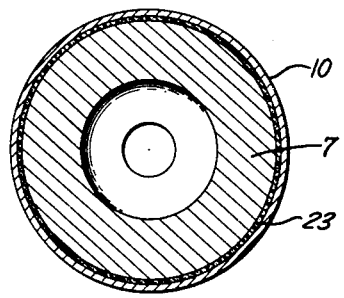
FIG. 3 is a transverse section taken along line 3—3 of FIG. 1.

As best shown in FIG. 2, the peripheral surface of the lower bearing housing is provided with a pair of connecting steps 20 and 21. The depth of the outer step 20 is substantially equal to the thickness of the shell and the inner surface of the shell 10 is in continuous, firm contact with the step 20 to provide a press fit. In addition, the end of the shell abuts the radially extending wall 22 defining the step 20.

The step 21 is provided with a substantially smaller diameter than the step 20 so that the step 21 is spaced radially inward of the inner surface of the shell to provide an annular clearance therebetween. The clearance contains a cured thermosetting resin 23 which serves to firmly bond the shell to each bearing housing. As best shown in FIG. 2, the exposed end of the layer of resin 23 defines a bead 24 which serves to further increase the seal at the joint and prevent leakage of the pump fluid into the motor cavity. The resin 23 may be any of the commonly used thermosetting resins such as an epoxide, polyester, melamine, urea, furane, and the like.

The use of the stepped surfaces 20 and 21 provides a joint construction that insures a uniform layer or coating of resin between the members. The outer step 20 is a machined surface and receives the end of the shell. As the two members are press fitted together, any irregularities or out-of-roundness in the thin-walled shell will be adjusted by the press fit between the shell and the machined surface 20. The use of the inner step 21 insures that a uniform layer of resin will be maintained between the shell and the bearing housing. This uniform layer of resin is critical because the resin not only serves to bond the members together, but must provide an effective seal to prevent leakage of the pumped fluid. If, for example, the stepped surface 21 was eliminated and the resin was applied directly to the surface 20, the shell, when inserted over the surface 20, would tend to scrape a portion of the resin from the surface due to the irregularities and out-of-roundness in the shell. This scraping the resin from portions of the surface would result in a non-uniform layer of resin and thereby provide areas of leakage which cannot be tolerated.

In assembly of the motor pump unit, a layer of the liquid uncured thermosetting resin containing the required curing agent or catalyst is applied by brushing or the like to the surface 21 of the lower bearing housing 7. The shell 10 is then slipped over the surface 20 and the resin layer 23 provides a bond between the surface 20 and the shell. The motor unit 1 is then inserted within the open end of the shell, and the upper bearing housing 9, with a layer of resin 23 applied to the surface 21 thereof, is inserted into the open end of the shell until the end of the shell engages surface 22. The assembled motor unit is then permitted to stand until the resin is fully cured.

The cured resin layer 23 not only bonds the members together but provides a positive seal at the joint. The use of the resin eliminates a substantial number of the parts required in a conventional mechanical-type seal, including clamping rings, bolts, washers, O-rings and the like. In addition, the invention reduces the number of machining operations which accompany the use of a conventional attachment.

The resin bond provides a tight connection which will not shrink or decompose in service and will not soften at operating temperature of the motor. However, the bond can be broken to separate the members in the event that repair or maintenance is required by heating the resin layer to a temperature within the range of 400° F. to 600° F. to decompose the resin. This can conveniently be done by "playing" a blow torch gas flame on the outer surface of the shell at the joint area. When re-assembling the unit, an additional layer of the liquid resin is applied to the surfaces 21 to bond the members together as in the manner previously described.

Various modes of carrying out the invention are contemplated as being within the scope of the following claims particularly pointing out and distinctly claiming the subject matter which is regarded as the invention.

I claim:

1. In a submersible motor-pump unit, a support member having an outer peripheral surface and having a first annular surface disposed axially adjacent said outer surface and having a diameter less than the diameter of said outer surface and said support member having a second annular surface disposed axially adjacent said first annular surface and having a diameter substantially less than said first annular surface, a thin-walled hollow shell having an end portion disposed in tight contiguous relation with said first annular surface and the inner wall of said shell being spaced radially outward from said second annular surface to provide a clearance therebetween, and a layer of a cured thermosetting resin disposed in the clearance and serving to bond the shell to said support member and the joint between the shell and said first annular surface being free of said resin.

2. The structure of claim 1 in which the outer surface of the shell is substantially flush with the outer peripheral surface of the support member.

3. In a submersible motor pump unit, a bearing housing having a pair of annular steps in the periphery thereof with the first of said steps disposed adjacent an end of said housing and said second step disposed axially adjacent said first step and having a substantially greater diameter than said first step, a thin-walled hollow metal shell having an end portion disposed around said steps with the inner surface of said shell being disposed in a press fit relation with said second step and the inner surface of said shell being spaced radially outward from said first step to provide an annular space therebetween, and a layer of a thermosetting resin disposed within the space and serving to bond said shell to the housing, said second step serving to align the shell with the housing and eliminate irregularities and out-of-roundness in the shell and said first step serving to provide a uniform layer of resin between the shell and the housing.

4. In a submersible motor-pump unit, a motor having a motor shaft, bearing means to journal the shaft, bearing support means for supporting the bearing means, said bearing support means having a first annular peripheral surface and having a second annular peripheral surface disposed axially adjacent said first surface and having a diameter substantially smaller than said first annular surface, an abutment connected to said bearing support means and located axially adjacent said first annular surface on the opposite side from said second annular surface, a thin-walled tubular shell having an end disposed in engagement with said abutment and having the inner surface of the end portion thereof disposed in tight contiguous relation with said first annular surface and having the inner surface of said shell spaced radially outward from said second annular surface to provide a clearance therebetween, and a cured thermosetting resin disposed in said clearance and serving to bond the shell to said support member, said first surface serving to align the shell and prevent out-of-roundness therein and said second annular surface serving to provide a uniform layer of resin between the support member and the shell.

References Cited in the file of this patent

UNITED STATES PATENTS

| | | |
|---|---|---|
| 2,703,371 | Wightman | Mar. 1, 1955 |
| 2,922,902 | Hargreaves | Jan. 26, 1960 |

FOREIGN PATENTS

| | | |
|---|---|---|
| 760,709 | Great Britain | Nov. 7, 1956 |